(12) United States Patent
Barnum et al.

(10) Patent No.: US 10,921,675 B2
(45) Date of Patent: Feb. 16, 2021

(54) CLOUD-BASED SYSTEM FOR CONTROLLING ELECTROCHROMIC DEVICES

(71) Applicant: Kinestral Technologies, Inc., Hayward, CA (US)

(72) Inventors: Walter Thomas Barnum, Salt Lake City, UT (US); Jason Aaron Litzinger, Salt Lake City, UT (US)

(73) Assignee: Kinestral Technologies, Inc., Hayward, CA (US)

( * ) Notice: Subject to any disclaimer, the term of this patent is extended or adjusted under 35 U.S.C. 154(b) by 0 days.

(21) Appl. No.: 16/786,703

(22) Filed: Feb. 10, 2020

(65) Prior Publication Data

US 2020/0257179 A1    Aug. 13, 2020

Related U.S. Application Data

(60) Provisional application No. 62/805,092, filed on Feb. 13, 2019.

(51) Int. Cl.

| | |
|---|---|
| *G02F 1/163* | (2006.01) |
| *G06F 8/65* | (2018.01) |
| *G06F 16/2455* | (2019.01) |
| *H04L 29/06* | (2006.01) |
| *H04L 29/08* | (2006.01) |
| *G05B 15/02* | (2006.01) |

(52) U.S. Cl.
CPC ............ *G02F 1/163* (2013.01); *G05B 15/02* (2013.01); *G06F 8/65* (2013.01); *G06F 16/24568* (2019.01); *H04L 63/0876* (2013.01); *H04L 67/06* (2013.01); *H04L 67/10* (2013.01)

(58) Field of Classification Search
CPC ...... G06F 1/163; G06F 8/65; G02F 16/24568; H04L 63/0876; H04L 67/06; H04L 67/10; G05B 15/02

See application file for complete search history.

(56) References Cited

U.S. PATENT DOCUMENTS

| | | | |
|---|---|---|---|
| 9,547,980 B2 * | 1/2017 | Chen ................... | G08C 17/02 |
| 9,647,906 B2 | 5/2017 | Asenjo et al. | |
| 10,210,368 B2 * | 2/2019 | Barnum ............ | G06K 7/10861 |
| 2006/0041881 A1 * | 2/2006 | Adkasthala ............. | H04L 67/34 |
| | | | 717/168 |
| 2013/0010781 A1 * | 1/2013 | Gresset ................. | H04J 3/0652 |
| | | | 370/350 |
| 2014/0064738 A1 | 3/2014 | Chen et al. | |

(Continued)

FOREIGN PATENT DOCUMENTS

WO      2013155467 A    10/2013

*Primary Examiner* — Marina Lee

(74) *Attorney, Agent, or Firm* — Lowenstein Sandler LLP

(57) ABSTRACT

A system for causing electrochromic devices to be controlled is described. The system may include a memory and a processing device coupled to the memory. The processing device may receive a data stream from a driver controlling a set of electrochromic devices, transmit a first subset of the data stream to a server device, and store at least a second subset of the data stream in a data file in the memory. The processing device may receive one or more instructions from the server device and transmit the one or more instructions to the driver to cause the set of electrochromic devices to be controlled based on the one or more instructions.

20 Claims, 5 Drawing Sheets

(56) References Cited

U.S. PATENT DOCUMENTS

2017/0131610 A1\* 5/2017 Brown .................. G05B 15/02
2018/0059520 A1 3/2018 Dubois et al.
2018/0144162 A1 5/2018 Barnum et al.

\* cited by examiner

CLOUD-BASED SYSTEM FOR CONTROLLING ELECTROCHROMIC DEVICES

RELATED APPLICATIONS

This application claims the benefit of U.S. Provisional No. 62/805,092, filed Feb. 13, 2019, the entire contents of which are incorporated by reference.

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering events and are also often used in automobile rearview mirrors to reduce reflective glare.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

DETAILED DESCRIPTION

Figure 1:
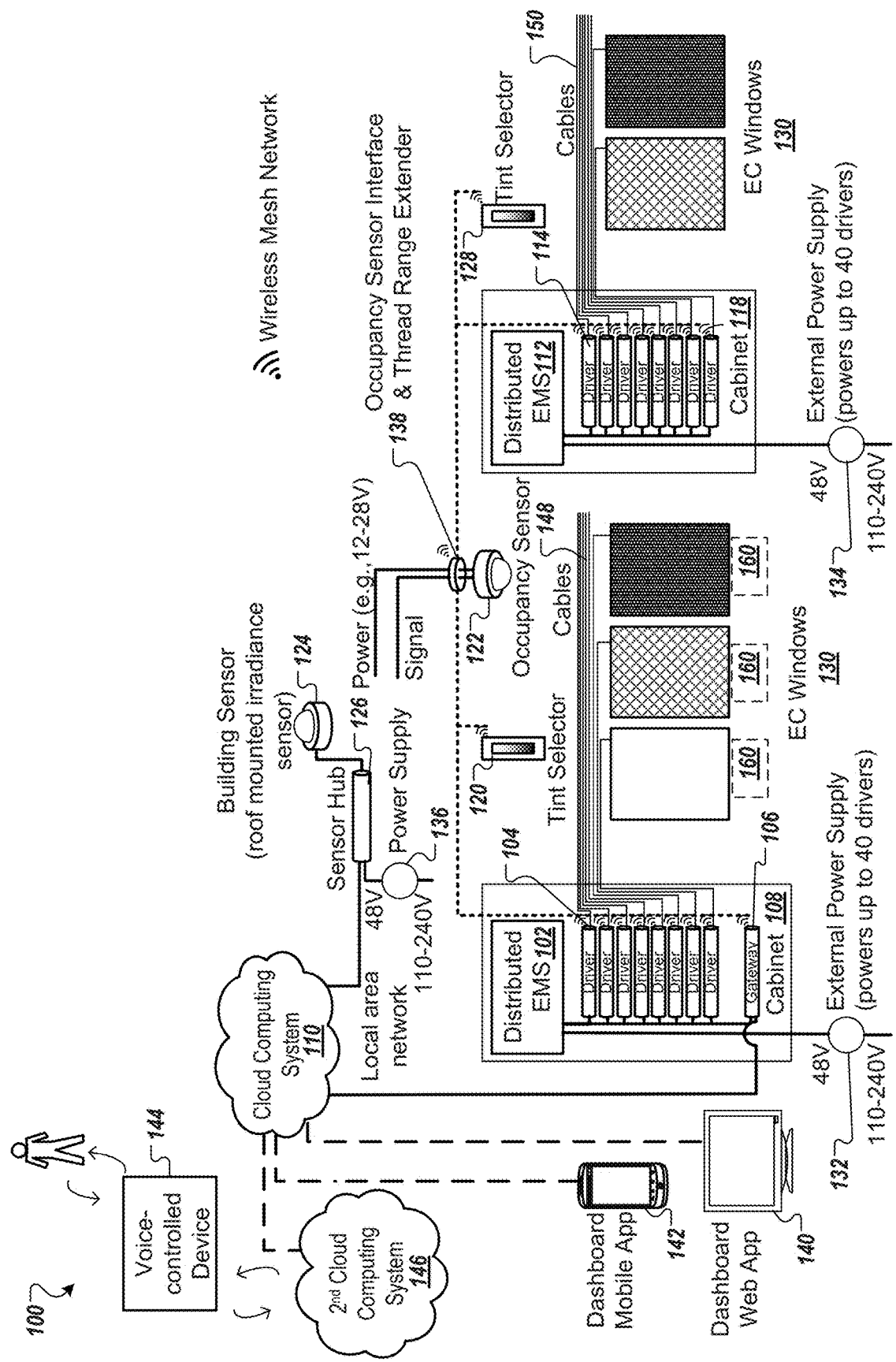
FIG. 1 is a block diagram of an electrochromic window system with a gateway associated with control of electrochromic windows, according to certain embodiments.

A cloud-based system for controlling electrochromic devices is described. Electrochromic devices can be, for example, used for smart windows in a commercial or residential building. A smart window refers to one or more glass units whose characteristics (e.g., a tint level representing a particular transmissivity parameter, reflective glare, etc.) can be changed automatically (e.g., at a particular time, in response to a weather condition, etc.). A modern multi-story building can include thousands of external and internal windows. As such, controlling electrochromic devices in an efficient manner becomes increasingly important.

Conventional systems typically use local computers to control electrochromic devices. However, the use of local computers has several deficiencies. Firstly, in order to cover more electrochromic devices, a local computer may control electrochromic devices via multiple local networks. For example, a local computer may control a first set of electrochromic devices via a wireless network and a second set of electrochromic devices via a wired network. To control the electrochromic devices via multiple local networks, a local computer may need to be configured for each of the local networks, may need to be granted authorization to access the local networks, and may need to update connection with the local networks (e.g., configurations, authorizations, etc.) responsive to the local networks being updated. Processor overhead of a local computer to troubleshoot the control of electrochromic devices via local networks may also increase as the number local networks increases.

Additionally, a user with access to a local network may be able to control any of the electrochromic devices connected to the local network. An administrator may want to limit user control (e.g., limit user control to just the electrochromic window in that user's office, limit user control for security purposes). In order to limit access for particular users to specific sets of electrochromic devices, an administrator may set up a separate virtual local area network (VLAN) for each user or set of users. Setting up separate VLANs can be time consuming, require extra energy, and require additional troubleshooting.

Further, a local computer can only control electrochromic devices coupled to that local computer and can only receive input from sensors coupled to that local computer. Updating or replacing a local computer or other devices in a conventional system may be time consuming (e.g., receiving and installing software updates, extracting the latest configurations from the old local computer or device and installing the latest configurations in the new local computer or device). In a conventional system, a local computer may collect and process data from local devices (e.g., local sensors, local electrochromic devices) in that system which may require increased processor overhead and energy consumption, resulting in decreased responsiveness of the local computer to user input, and may lead to slower changing of electrochromic devices. Furthermore, in a conventional system, the local computer may track the data collected and processed over time by that local computer and may run analytics on the data to improve functionality of the conventional system. The analytics ran by the local computer are limited to the data received by the local computer from local devices. The analytics may not provide a complete picture because each local computer may not learn from other local computers (e.g., a local computer is limited to its own analytics and may not improve its system based on analytics of other local computers) and each local computer may not learn from data received by other local computers from their local devices (e.g., each local computer may not receive data from other local devices coupled to other local computers).

Aspects of the present disclosure address the deficiencies of conventional systems by providing a cloud-based system for controlling electrochromic devices that includes a gateway and a server device. The gateway may receive a data stream from a driver (e.g., that controls an electrochromic device) and transmit at least a portion of the data stream to a server device. For example, the data stream may include events (e.g., the driver changing an electrochromic device from a first tint level to a second tint level), faults (e.g., the driver detected that the electrochromic device exceeded a threshold temperature or stopped tinting), and measurements (e.g., the driver determined a current measurement or voltage measurement of the electrochromic device). The gateway may identify a first subset (e.g., events, faults, etc.) of the data stream that is more relevant than a second subset (e.g., measurements) of the data stream. Upon identifying the first subset, the gateway may transmit the first subset to the server device. The gateway may store the second subset in a data file and may transmit the data file to the server device at a predetermined time. As the second subset is received, the second subset may be stored in a data file and the data file may be transmitted to the server device daily at a predetermined time. By transmitting the first subset of the data stream as the first subset is identified and transmitting the second subset periodically (e.g., daily), bandwidth and cost may be reduced, processing can be offset to the server device, and multiple systems can benefit from the processed data of one system.

The gateway stores credentials (e.g., in credentials files) and uses the credentials to communicate with the server device (e.g., and other devices). The credentials may be used for a cloud-based system to operate. By using the credentials, the gateway may access a server device in the cloud-based system. By using the cloud-based system for communications (e.g., instead of local network topology), permissions for user control of the electrochromic devices may be handled at the user level at the server device (e.g., without the use of separate VLANs).

The gateway may also store configuration files (e.g., a corresponding configuration file for each driver). Upon determining a driver has been replaced with a new driver, the gateway may configure the new driver based on the corresponding configuration file. The gateway may receive software updates (e.g., gateway software updates, driver software updates, etc.) from the server device and may update devices of the system based on the software updates.

The gateway may also store settings files (e.g., predetermined schedule, default rules) and may transmit instructions to the drivers to control the electrochromic devices based on the settings files. Upon receiving server instructions (e.g., based on current sensor readings received via the sensor hub, user input received via a tint selector, etc.) from the server device, the gateway may transmit the server instructions to the drivers to control the electrochromic devices according to the server instructions. The server instructions may be based on signals from sensors remote from the gateway (e.g., on different buildings) that are communicably coupled to the server device.

The gateway may be coupled to one or more manual controls (e.g., a tint selector). The gateway may receive a signal from the tint selector for controlling the electrochromic devices coupled to the gateway and additional electrochromic devices not coupled to the gateway. The gateway may transmit the signal to the server device and the server device may transmit the signal to a second gateway to control the additional electrochromic devices based on the signal.

Accordingly, the technology described herein results in technological advantages over conventional systems. In the cloud-based system for controlling electrochromic devices, the server device may be connected to multiple gateways via a network to control electrochromic devices. By the server device connecting to gateways via the network, the cloud-based system has the technological advantage of avoiding processor overhead and troubleshooting associated with a local computer connecting to multiple local networks (e.g., configurations, authorization, and updates for each local network, etc.).

Instead of requiring a separate VLAN for each user to limit user control as in conventional systems, the server device may limit user control of electrochromic devices by setting up user authorizations at the server level. The cloud-based system thereby has the technological advantages of avoiding the time, extra energy, and extra troubleshooting of setting up and maintaining a separate VLAN for each user.

Instead of being limited to data received from local devices as in conventional systems, the gateway in the cloud-based system can control (e.g., directly control based on settings files, provide a conduit for control, etc.) electrochromic devices based on data received by the server device from devices that are not on the same wireless mesh network as the gateway (e.g., the server device may send instructions to multiple gateways based on sensor data from multiple sensor hubs on different buildings, etc.). Instead of being limited to local analytics as in conventional systems, the server device can perform analytics based on data received from multiple gateways and sensor hubs. By not being limited to local devices and local analytics of a local computer, the cloud-based system may thereby provide more accurate control of electrochromic devices.

FIG. 1 is a block diagram of an electrochromic window system 100 (e.g., smart window system) with a gateway 106 associated with the control of electrochromic devices (e.g., electrochromic (EC) windows 130), according to one embodiment. In some embodiments, the gateway 106 may provide a conduit of control (e.g., by receiving instructions from the cloud computing system 110 and transmitting the instructions to the drivers 104). In some embodiments, the gateway 106 may control the EC windows 130 (e.g., based on a settings file, schedule, etc.). The electrochromic window system 100 includes a first cabinet 108 in which a first distributed energy management system (EMS) 102, a first set of drivers 104, and a gateway 106 are located. In an alternate embodiment the drivers 104 may be integrated drivers where one or more drivers are integrated into the EC windows. Each of the set of drivers 104 is coupled to an individual one of a set of EC windows 130. Alternatively, other electrochromic devices can be driven by the set of drivers 104. The set of drivers 104 are coupled to the set of EC windows 130 via power cables 148 and control wires. The cabinet 108 can be a standard size, such as 28", 42", or 60". The cabinet 108 can be located in proximity to the EC windows 130 or located away from the EC windows 130, such as up to 300 feet. The cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 102, the set of drivers 104, and the gateway 106 within the first cabinet 108. For example, 16 AWG 2 conductor plenum cables can provide lower voltage (48V) or higher voltage (110-240V) to the first cabinet 108. The external power supply 132 can be located in proximity to the first cabinet 108 or farther away from the first cabinet 108, such as up to hundreds of feet or up to 1000 feet. In some embodiments, the external power supply 132 is configured to supply less than 25% of a maximum power used by the set of EC windows 130 during switching of one or more of the set of EC windows 130. Additional external power supplies can be used to power the components in the first cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

Although portions of the present disclosure describe the electrochromic window system 100 in relation to a distributed EMS, the electrochromic window system 100 may include one or more different types of power sources (e.g., a battery, a local power source inside of a driver, a multi-device boost power supply, etc.) in addition to or instead of the distributed EMS.

In some embodiments, a driver for an EC window may be integrated into the EC window itself in either the frame of the window, in the integrated glass unit (IGU) of the EC window, or in the laminated glass unit (LGU) of the EC window.

Each EC window may include an electrochromic panel (e.g., glass or film) that can change transmissivity with the application of electric current and voltage. The change of transmissivity typically relies on a reversible oxidation of a material. Electrochromic units can darken at the press of a button (e.g., user input via tint selector 120 or 128, dashboard web app 140, dashboard mobile app 142, etc.) or in response to an automatic triggering event and are also often used in automobile rearview mirrors to reduce reflective glare. In some embodiments, upon receiving user input via the tint selector 120 to tint a first EC window associated with a first driver, the tint selector 120 may transmit instructions to the first driver and the first driver may control the tint level of the EC window. In some embodiments, upon receiving user input via a user device to tint a first EC window associated with a first driver, dashboard web app 140 or dashboard mobile app 142 (e.g., executing on the user device) may transmit the user input to the cloud computing system 110, the cloud computing system 110 may transmit the user input to the gateway 106, and the gateway 106 may transmit the user input to the first driver to cause the first driver to control the tint level of the first EC window. The different transmissivities of the EC windows may be referred to as tint levels (e.g., 0% tint level is 65% transmissivity, 50% tint level is 21% transmissivity, 100% tint level is 2% transmissivity, etc.).

In some embodiments, one or more power sources (e.g., the distributed EMS, a battery, a local power source inside of a driver, a multi-device boost power supply, etc.) may provide additional power (e.g., boost power) to an electrochromic device (e.g., EC window 130) that can be supplied by a main power supply. The one or more power sources may support a varied number of EC windows based on geometry and size of the EC windows, how often the EC windows are tinted, as well as how low other power sources (e.g., the batteries of the distributed EMS 102) can be discharged.

Each power source (e.g., distributed EMS 102) may supply power to the set of drivers 104 according to a power state of the set of EC window 130, as well as the power state of other power sources (e.g., multi-device boost power supply 208). For example, the distributed EMS 102 can supply a first amount of power to the set of drivers 104 from an external power supply interface in an idle state of the set of EC windows 130. Alternatively, the distributed EMS 102 does not supply power to the set of EC windows 130 in the idle state. In some embodiments the idle power level of an EC window may be zero, for example when the type of EC device used only requires power to switch from one optical transmission state to another optical transmission state. The power state information (e.g., idle state, tinted state, transitioning between states, etc.) may be provided to the gateway 106 and may be shared with the cloud computing system 110.

The additional power provided by the one or more power sources can enable fast and uniform switching in a variety of conditions, and in particular when the EC window 130 includes a gradient conductive layer.

An EC window 130 including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an EC window 130 incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide. In other embodiments, the distributed EMS 102 can be used in connection with drivers that drive other types of EC windows 130. Additionally, the distributed EMS can be used to drive multi-panel electrochromic windows that include more than one EC window 130 connected in series or parallel. A multi-panel electrochromic window may be one where the EC window 130 are stacked over one another to provide very low transmissivity of light through the devices, for example less than 1% transmissivity of light or less than 0.1% transmissivity of light. Alternatively the multi-panel electrochromic windows may be "tiled" adjacent to one another such that more than one EC window 130 is laminated to a carrier glass substrate to form larger sized windows. In another embodiment a single driver may be used to drive multiple electrochromic windows that may be in a group of electrochromic windows. For example a single driver may drive two or more electrochromic windows.

The gateway 106 is operatively coupled to a cloud computing system 110. A cloud computing system refers to a collection of physical machines (e.g., server devices), that host applications providing one or more services to multiple components (e.g., gateway 106, sensor hub 126, drivers 104, distributed EMS 102, user devices executing dashboard mobile app 142 or dashboard web app 140, etc.) via a network. In some implementations, the applications hosted by cloud computing system 110 may provide services (e.g., scheduling, viewing, remote management, glare control, etc.) to users accessing the cloud computing system 110 via a network. The applications may allow users to manipulate (e.g., access, create, edit, store, delete, share, collaborate, print, etc.) electronic documents (e.g., schedules, rules, configurations, glare control, etc.). The cloud computing system 110 may include one or more server devices and one or more data stores. The cloud computing system 110 may include cloud computing module 224 (e.g., see FIG. 2). The cloud computing module 224 may include one or more applications, one or more server devices, etc. The gateway 106 can be hardwired (e.g., via Ethernet) to a network device of a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using secure communications, such as using IPV4, IPv6, or Transport Layer Security (TLS) networking protocols. The cloud computing system 110 can provide control logic, glare control (e.g., cause tint level of the EC windows 130 to be set to avoid glare), and configuration for the electrochromic window system 100. The cloud computing system 110 may receive information (e.g., via one or more application programming interfaces (APIs), weather information, etc.) for providing glare control, etc. The cloud computing system 110 may determine which EC windows 130 each device (e.g., tint selector 120 or 128, gateway 106, etc.) and each application (e.g., dashboard mobile app 142, dashboard web app 140, etc.) is authorized to view and/or control and the priority of control. For example, the cloud computing system 110 may determine that the tint selector 120 is authorized to control EC windows 130 that are connected to drivers 104. In another example, the cloud computing system 110 may determine that the dashboard mobile app 142 logged in by a first user is authorized to view and control only the first window of the EC windows 130. During configuration (e.g., commissioning, set-up by an administrator), the cloud computing system 110 may receive instructions of which users and which devices are authorized to control which EC windows 130. In some embodiments, the cloud computing system 110 may authorize access by components (e.g., tint selectors 120 and 128, gateway 106, etc.) to a wireless mesh network (e.g., during commissioning or set-up) and once authorized, subsequent access of the wireless mesh network is not dependent on further authorization (e.g., components are authorized during commissioning or set-up and do not need further authorization to continue accessing).

In some embodiments, the cloud computing system 110 may use machine learning to provide control of the EC windows 130. In some embodiments, the cloud computing system 110 may include a broker module to receive data from the gateway 106, sensor hub 126, etc. (e.g., for providing glare control, for providing data visibility) and to transmit data to other gateways 106. In some embodiments, control of the EC windows 130 may be distributed over the cloud computing system 110 and the gateway 106. For example, the cloud computing system 110 may provide settings files (e.g., a schedule, rules, etc.) to the gateway 106 and the gateway 106 may control the EC windows 130 based on the settings files. The cloud computing system 110 may send additional instructions to the gateway 106 to deviate from the settings files in controlling the EC windows 130 (e.g., responsive to the cloud computing system 110 receiving user input via a dashboard mobile app 142, sensor data via the sensor hub 126, the gateway 106 may provide a conduit for control of the EC windows 130, etc.)

The cloud computing system 110 can provide automation algorithms, data analytics, user management, security protocols, and the like. The cloud computing system 110 can provide extensive system health monitoring and proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The dashboard web app 140 and the dashboard mobile app 142 are applications that may be executed on one or more user devices. For example, the dashboard mobile app 142 may execute on a mobile user device, such as a smart phone or a tablet. The dashboard web app 140 may execute on a desktop, laptop, etc. The dashboard web app 140 or the dashboard mobile app 142 (executing on a user device) may receive user input (e.g., selection of one or more EC windows and a tint level) via the user device and may transmit the user input to the cloud computing system 110. Responsive to determining that the user input is a request to view information (e.g., monitor current status of components, current mode of EC windows 130, etc.), the cloud computing system 110 may retrieve the information and transmit the information to the user device to cause the dashboard web app 140 or dashboard mobile app 142 to display the requested information. Responsive to determining that the user input is a request to change operation of one or more components of the electrochromic window system 100, such as a request to tint a first EC window associated with a first driver, the cloud computing system 110 may transmit the user input to the gateway 106, the gateway 106 may transmit the user input to the first driver, and the first driver may control the tint level of the first EC window based on the user input.

The cloud computing system 110 can also interact with other devices or networks, such as a second cloud computing system 146, as illustrated in FIG. 1, that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture that is exposed through APIs to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The centralized data aggregation of the cloud computing system 110 may also include data from the manufacturing, testing, and assembly of the EC Windows 130 and any associated hardware of the electrochromic window system 100 (e.g. drivers 104, gateways 106, etc.). The cloud computing system 110 can leverage various authentication and authorization technologies to secure site access. The cloud computing system provides a robust platform that facilitates on-demand load scaling and health monitoring. The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each other over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

It should be noted that, after the drivers and the distributed EMS are configured via the gateway, the distributed EMS and driver behavior is not dependent on the gateway for safe operation. That is, the gateway can be disconnected and the drivers will not drain the batteries of the distributed EMS.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), and a sensor hub 126.

The sensor hub 126 can be powered by an external power supply 136 and can be hardwired to a local area network, much like the gateway 106.

The occupancy sensor interface, thread range extender 138, and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network.

The tint selector 120 can be a device that is mounted on a wall where a user can activate a transition of one or more EC windows 130. The tint selector 120 can be mounted or otherwise disposed in a building having the EC windows 130 to permit user control of one or more EC windows 130 (e.g., the set of EC windows). The tint selector 120 can be programmed to be part of group of EC windows (e.g., a set of windows that are to be set at the same tint level, e.g., all EC windows in the group tinted 50%). That is, the tint selector 120 can be associated with the set of drivers 104 and the gateway 106. Alternatively, the tint selector 120 can be associated with a scene of one or more EC windows. Upon receiving user input (e.g., via the tint selector 120) for EC windows to be tinted in a scene, one or more first EC windows of the scene are to be tinted at a first tint level and one or more second EC windows of the scene are to be tinted at a second tint level (e.g., all EC windows of the scene are to be tinted 100% except for one EC window of the scene that is to be tinted 50%). Upon receiving user input, the tint selector may transmit (e.g., multicast) a signal to the corresponding drivers to cause the EC windows to change tint level. The tint selector may also transmit the user input to the gateway 106 to cause the gateway to transmit the user input to the cloud computing system 110.

The electrochromic window system 100 can include one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the first cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1.

In another embodiment, the electrochromic window system 100 includes drivers 160 located at each of the set of EC windows 130, instead of or in addition to the set of drivers 104 in the first cabinet 108. In some cases, each EC window 130 has a driver 160, as illustrated. In other cases, a single driver 160 can drive multiple EC windows 130. The drivers 160 can be coupled to an external power supply. The external power supply can be located at the EC window 130 or in close proximity. In this case, the external power supplies for the set of EC windows 130 can be considered to be distributed, instead of centralized as described above. In other cases, the drivers 160 do not use an external power supply.

It should be noted that various embodiments described herein are described with respect to a commercial installation. In other embodiments, the electrochromic window system 100 can be deployed in a residential installation. In those cases, there may be modifications to the electrochromic window system 100 as described above to accommodate differences between the commercial installation and the residential installation.

In some embodiments (e.g., residential installations), one or more of the components of the electrochromic window system 100 may be combined. For example, one piece of hardware may include a gateway and may include two or more electrochromic windows (e.g., hardware that includes a gateway and one or more drivers). In some embodiments (e.g., residential installations), the gateway may transmit data less frequently and/or transmit less data. In some examples, the gateway transmits data at a predetermined point in time (e.g., without transmitting a subset of the data stream immediately). In some examples, the gateway discards a subset of the data stream (e.g., does not store the subset in the data file to be transmitted to the server device. In some examples, the gateway stores the data stream or a subset of the data stream locally (e.g., instead of transmitting the data stream to the server device). In some embodiments, the gateway transmits a subset of the data stream to the server device responsive to a request (e.g., specifying particular types of events, errors, malfunctions, etc.) from the server device (e.g., otherwise the gateway stores and/or discards data). In some embodiments, the gateway dynamically configures what data is transmitted (e.g., based on bandwidth, storage, cost, etc.). In some embodiments, the gateway transmits and/or stores the data that changes (e.g., changes over time, varies from a schedule, that is not redundant, changes from last state of interest, reportable change, anomalous behavior, manually overriding a tinting schedule, etc.).

In some embodiments, one or more of a corresponding tint selector 120, driver 104, one or more EC windows 130, occupancy sensor, etc. are located in each unit (e.g., townhome, apartment, portion of prefabricated building, portion of modular building) and a common gateway 106 is located in a central location (e.g., hallway, mechanical room, etc.). Thread range extenders may be used for the common gateway 106 to communicate with the other components. A user may have access to a user account and a tint selector that only control EC windows 130 corresponding to the unit to which the user has access.

In some embodiments, one or more components (e.g., gateway 106, sensor hub 126, etc.) of the electrochromic window system 100 may have two or more network connections. In some examples, two or more wired network connections (e.g., each corresponding to a different network) may be routed to the same component. In some examples, a wired network connection and a wireless network connection (e.g., each corresponding to a different network) may be provided to the same component. In some examples, two or more wireless network connections (e.g., each corresponding to a different network) may be provided to the same component. A first network may be a primary network (e.g., cable network, Ethernet network, etc.0 and a second network may be a cell modem backup network (e.g., integrated cellular modular in the cabinet). The cabinet 108 may have a router for receiving the different network connections. The one or more networks to which components of the electrochromic window system 100 are connected may be separate from other building networks.

In some embodiments, one or more components (e.g., gateway 106, sensor hub 126, etc.) of the electrochromic window system 100 transmit and receive data via the network that is functioning (e.g., if the primary network is down, the cell modem backup network is used). In some embodiments, one network (e.g., cable network) has a lower price than a backup network (e.g., cell modem backup network). The components of the electrochromic window system 100 may send higher priority data via whichever network is functioning and may wait until the lower-price network is functioning to transmit lower priority data. In some embodiments, one or more components (e.g., gateway 106, sensor hub 126, etc.) of the electrochromic window system 100 are aware of which network connection is functioning. In some embodiments, one or more components (e.g., gateway 106, sensor hub 126, etc.) of the electrochromic window system 100 transmit a message to the cloud computing system 110 (e.g., requesting via which network the cloud computing system 110 is receiving the message) and the cloud computing system 110 may provide a response indicating via which network (e.g., hardwired network or cellular network) the message was received. The component of the electrochromic window system 100 may determine which network is functioning based on the response.

In some embodiments, one or more components of the electrochromic window system 100 use wireless power (e.g., wireless power transfer (WPT), non-wired power). The wireless transfer of power may be via induction (e.g., electromagnetic induction, inductive coupling of magnetic fields, non-radiative induction), resonance (e.g., radiative electromagnetic resonance, resonance induction), radio frequency (RF) power transfer (e.g., uncoupled RF wireless power transfer), microwave power transfer, and/or laser power transfer. For example, a driver may wirelessly transmit power to an EC window 130.

In some embodiments, one or more of the EC windows 130 are photovoltaic (PV) windows (e.g., PV EC windows) that include a PV coating coupled to a battery. The PV coating may collect energy from the sun and charge the battery. The battery, wireless power, and/or an external power supply (e.g., via one or more drivers, via distributed EMS, etc.) may be used to tint the EC window (e.g., the battery may be used first and then one or more drivers may be used as a backup power supply).

Figure 2:
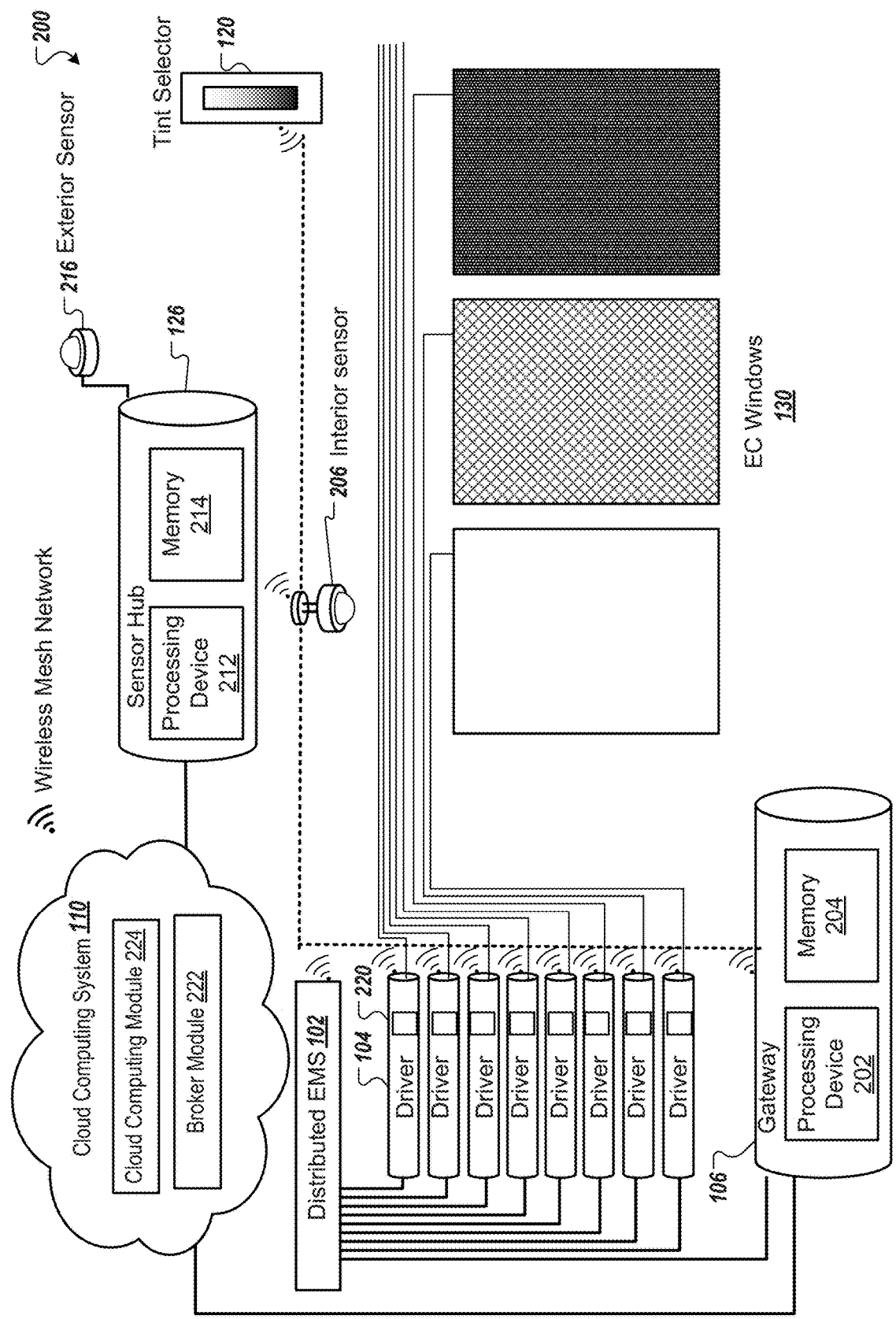
FIG. 2 is a block diagram of an electrochromic window system with a gateway associated with control of electrochromic windows, according to certain embodiments.

FIG. 2 is a block diagram of an electrochromic window system 200 (e.g., smart window system) with a gateway 106 associated with the control of electrochromic devices, according to certain embodiments. Components with the same reference number as those in FIG. 1 may include similar or the same functionalities as those described in relation to FIG. 1. In some embodiments, functionalities described herein as performed by the cloud computing system 110 (e.g., cloud computing module 224, broker module 222, etc.) can be performed by the gateway 106 (e.g., gateway 106 controls the EC windows 130). In some embodiments, functionalities described herein as performed by the gateway 106 can be performed by the cloud computing system 110 (e.g., the cloud computing system 110 controls the EC windows 130 and the gateway 106 provides a conduit for control). In some embodiments, the cloud computing system 110 may coordinate control of the EC windows 130. In some embodiments, the gateway 106 may coordinate control the EC windows 130 responsive to not receiving instructions for controlling the EC windows 130 from the cloud computing system 110. For example, the cloud computing module 224 (e.g., logic, schedules, trained machine learning model, a retrained machine learning model, etc.) may be deployed at the gateway 106. Components of the electrochromic window system 200 may have a wired and/or wireless connection to one or more other components of the electrochromic window system 200. For example, the gateway may have a wired and/or wireless connection to one or more of the distributed EMS 102, one or more drivers 104, sensor hub 126, exterior sensor 216, interior sensor 206, tint selector 120, and/or one or more EC windows 130. Each of the components of the electrochromic window system 200 may have one or more wireless interfaces, one or more wired interfaces, or any combination thereof. For example, one or more components of the electrochromic window system 200 may include one or more radios, one or more wired transceivers (e.g., Universal Asynchronous Receiver/Transmitter (UART), power line communication (PLC) transceiver), or the like. One or more components (e.g., drivers 104, the gateway 106, the tint selector 120, or the like) of the electrochromic window system 200 may communicate over one or more wired connections or even over power lines.

One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the cloud computing module 224. In some embodiments, the cloud computing module 224 is a single module that operates on the cloud computing system 110. In some embodiments, the cloud computing module 224 includes two or more modules (e.g., two or more microservices, two or more applications). In some embodiments, the cloud computing module 224 may include one or more applications and one or more servers.

The electrochromic window system 200 may include the cloud computing system 110 and components including one or more of drivers 104, one or more gateways 106, EC windows 130 (e.g., PV EC windows, battery coupled to PV coating, etc.), distributed EMS 102, tint selector 120, interior sensors 206, sensor hub 126, exterior sensors 216, components associated with wireless power transfer, etc. The cloud computing system 110 may include the cloud computing module 224 and broker module 222. The cloud computing module 224 may identify, send instructions to, and receive data from the components of the electrochromic window system 200 (e.g., via broker module 222).

The cloud computing system 110 is coupled to one or more gateways 106, a sensor hub 126, a dashboard web app 140, and a dashboard mobile app 142. Each gateway 106 may be coupled via a corresponding wireless mesh network to drivers 104, interior sensors 206 (e.g., occupancy sensor 122, occupancy sensor interface and thread range extender 138, etc.), one or more tint selectors 120, and the distributed EMS 102. The gateway 106 may include characteristics of one or more of a hub, proxy, or aggregator. A sensor hub 126 may be coupled to one or more exterior sensors 216. The drivers 104, distributed EMS 102, tint selector 120, and interior sensors 206 may be disposed proximate the gateway 106 (e.g., within the building, within range of the wireless mesh network, etc.). The interior sensors 206 may include one or more of interior light sensors, a sensor on a window to collect EC window 130 transmittance data, sensors to collect photographic data from interior of building, occupancy sensors, etc. The exterior sensors 216 may be disposed proximate sensor hub 126 (e.g., proximate the roof of the building, on the roof, proximate the edge of the roof, etc.). The exterior sensors 216 may include one or more of light sensors on the sides of buildings, temperature and/or humidity sensors, sensors (or cameras) to collect photographic data of cloud cover (or irradiance), irradiance sensor, rooftop pyranometer sensor (e.g., measure total global irradiance, measure diffuse horizontal irradiance (shadowed light, diffuse horizontal irradiance (DHI)), calculate direct normal irradiance, include non-visible spectrum), etc. DHI may refer to the terrestrial irradiance received by a surface (e.g., horizontal surface) which has been scattered or diffused by the atmosphere. DHI may be a component of global horizontal irradiance which may not come from the beam of the sun (e.g., beam may be about a 5-degree field of view concentric around the sun).

In some embodiments, a sensor (e.g., interior sensor 206, exterior sensor 216) transmits sensor data to the gateway 106. For example, one or more exterior sensors 216 (e.g., camera, temperature sensor, illuminance sensor, humidity sensor, pressure sensor, rain sensor, or the like) may be mounted on the roof and may transmit data (e.g., sensor data, images, etc.) to the gateway 106. In some embodiments, an exterior sensor 216 is coupled (e.g., wirelessly, wired, etc.) with the gateway 106 (e.g., without use of a sensor hub 126). In some embodiments, an exterior sensor 216 communicates with cloud computing system 110 (e.g., without use of a sensor hub 126, without use of gateway 106). In some embodiments, a sensor (e.g., interior sensor 206, exterior sensor 216) has a wireless module to be able to communicate with the cloud computing system 110 and/or other components (e.g., sensor hub 126, gateway 106, etc.). In some embodiments, one or more exterior sensors 216 and a sensor hub 126 may be integrated into a single component that has the functionalities of one or more exterior sensors 216 and the sensor hub 126.

The gateway 106 and a sensor hub 126 may be coupled to the cloud computing system 110. The cloud computing system 110 may include a broker module 222 and a cloud computing module 224. In some embodiments, the cloud computing system 110 includes one or more server devices that include broker module 222 and cloud computing module 224. One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the cloud computing module 224. In some embodiments, the cloud computing module 224 is a single module that operates on the cloud computing system 110. In some embodiments, the cloud computing module 224 includes two or more modules (e.g., two or more microservices).

The gateway 106 includes a processing device 202 and a memory 204. The memory 204 may be a persistent (e.g., non-volatile) storage. In some embodiments, the memory 204 may include flash memory, such as an embedded multi-media controller (eMMC) memory (e.g., flash memory and flash memory controller integrated on the same silicon die). In some embodiments, the memory 204 may include random-access memory (RAM) to store a representation (e.g., state) of each node (e.g., driver 104, distributed EMS 102, interior sensor 206, tint selector 120, etc.) on the wireless mesh network at a given time. The memory 204 may store settings files, one or more configuration files, and a data file. The memory 204 may store a different configuration file for each different type of driver 104 (e.g., a different configuration file for each driver 104 that controls a different type (e.g., size) of EC window 130). The data file (e.g., log file) may include less relevant data aggregated from the data streams from the drivers 104. The data in the data file may not be retained in memory 204 subsequent to transmitting of the data file to the cloud computing system 110 (e.g., the data may be transmitted to the cloud computing system 110 and then erased from the memory 204).

The sensor hub 126 includes a processing device 212 and a memory 214. The processing device 212 may be similar to the processing device 202 of the gateway 106 and the memory 214 may be similar to the memory 204 of the gateway 106. The sensor hub 126 is coupled to one or more exterior sensors 216 (e.g., building sensor 124, roof mounted irradiance sensors) and the cloud computing system 110. The memory 214 may store a configuration file (e.g., indicating settings, schedule, rules, etc.) of the sensor hub 126. The sensor hub 126 may be coupled to each exterior sensor 216 by one or more interconnects (e.g., physical links, wireless links, etc.). For example, a first interconnect coupling the sensor hub 126 and an exterior sensor 216 may be a first cable for serial data transfer (e.g., transferring sensor data) and a second interconnect coupling the sensor hub 126 and the exterior sensor 216 may be a second cable for heating of the exterior sensor 216 (e.g., power supply for heating the sensor upon detecting snow or ice).

Each of the drivers 104 includes a control module 220. Each control module 220 may include a processing device and memory. Each control module 220 may include one or more of configurations (e.g., individual settings based on the size of the corresponding EC window 130), software, or firmware. Drivers 104 of the same type (e.g., type of hardware) or category may include the one or more of the same software or firmware. Each of the drivers 104 is coupled to the gateway 106 and a corresponding tint selector 120 via the wireless mesh network. Each of the drivers 104 is coupled to a corresponding EC window 130, or alternatively a driver 104 may be coupled to two or more EC windows. In an alternate embodiment the EC window 130 may have multiple electrochromic panels. In this embodiment the multiple electrochromic panels may each be coupled to a driver 104 or the multiple electrochromic panels may be coupled to a single driver 104 (e.g. a two panel EC window would be driven by a single driver 104.) Each of the drivers 104 may transmit a corresponding data stream to the gateway 106 based on the driver 104 and the corresponding EC window 130. Each data stream may include events (e.g., indicating an EC window 130 changing from a first tint level to a second tint level, a driver 104 being reset), faults (e.g., the EC window 130 exceeded a threshold temperature or stopped tinting), and measurements (e.g., a current measurement or voltage measurement of the electrochromic device). Each driver 104 may transmit measurements periodically (e.g., send current and voltage measurements every 30-45 seconds) and may transmit events and faults upon identifying the events and faults (e.g., more rapidly than every 30-45 seconds, in real-time). Each data stream may include the measurements (e.g., periodically sent), events (e.g., sent as identified), and faults (e.g., sent as identified). Each driver 104 may have an internal buffer for filtering the transmission of measurements, events, and faults. The driver may transmit a current measurement and a voltage measurement as measured at a first point in time (e.g., zero seconds), transmit a current measurement and a voltage measurement as measured at a second point in time (e.g., thirty seconds), and the current and voltage measurements between the first point in time and the second point in time (e.g., 1-29 seconds) may be disregarded (e.g., not transmitted, not stored).

The gateway 106 may transmit sensor data received from interior sensors 206 and signals received from the tint selector 120 to the cloud computing system 110. The tint selector 120 may transmit a signal to one or more components (e.g., to the drivers 104, to the drivers 104 and the gateway 106) to set the tint level of one or more EC windows 130. For example, the tint selector 120 may transmit a signal to a set of drivers 104 to set multiple EC windows 130 at the same tint level (e.g., where the multiple EC windows 130 are along the same façade, correspond to the same conference room, etc.). In another example, the tint selector 120 may transmit a signal to a set of drivers 104 to set different EC windows 130 at different tint levels (e.g., a first EC window 130 at a first tint level and a second EC window 130 at a second tint level). In some embodiments, the tint selector 120 may transmit a signal to the drivers 104 (to cause EC windows 130 coupled to the drivers 104 to be set to a tint level) and/or the gateway 106 (to cause EC windows coupled to a different gateway to be set to a tint level).

The processing device 202 of the gateway 106 may receive each of the data streams and transmit at least a portion of the data streams to the cloud computing system 110. For example, the processing device 202 may identify a first subset of data (e.g., events, faults, etc.) from the data streams that is more relevant (e.g., higher priority) than a second subset of data (e.g., current measurements, voltage measurements, etc.) from the data streams. Upon identifying the first subset, the processing device 202 may transmit (e.g., faster than the second subset) the first subset to the cloud computing system 110 (e.g., server device). The processing device 202 may store the second subset in a data file in the memory 204 and may transmit the data file to the cloud computing system 110 at a predetermined time. For example, the processing device 202 transmits a data file at a predetermined time each day, where the data file includes the second subset of data (e.g., measurements, etc.) received from the drivers 104 since the previous data file was transmitted.

The broker module 222 of the cloud computing system 110 may receive, via the gateway 106, the first subset of data (e.g., that is transmitted upon being identified), the data file (e.g., that is transmitted periodically), sensor data (e.g., from the interior sensors 206), and signals (e.g., from the tint selector 120). The broker module 222 may also receive sensor data via the sensor hub 126 (e.g., received from the exterior sensors 216). The cloud computing module 224 may retrieve different types of data from the broker module 222. The cloud computing module 224 may store different types of data in different data stores (e.g., databases) of the cloud computing system 110 (e.g., responsive to listening for different types of data, via one or more APIs). For example, the cloud computing module 224 may store the data files (e.g., second subset of data that is less relevant than the first subset of data, current and voltage measurements, etc.) in a corresponding data store to be used for historical analysis. The cloud computing module 224 may store sensor data from one or more of an exterior sensor 216 or an interior sensor 206 in a corresponding data store to be used for performing glare control. The cloud computing module 224 may store fault data in a corresponding data store for troubleshooting or alerting the user. The cloud computing module 224 may store data indicating changing tint levels of EC windows 130 in a corresponding data store. The cloud computing module 224 may retrieve (e.g., and distribute) data from the different data stores for performing different functions (e.g., historical analysis, troubleshooting, alerting, reporting changing of tint levels, performing glare control, etc.). The cloud computing module 224 may retrieve data from different data stores for different microservices or event statements.

In some embodiments, the gateway 106 may (e.g., based on settings files), transmit data (e.g., received from drivers, etc.) to the cloud computing system 110 at certain times of day, certain days of the week, and/or during certain modes. For example, the gateway 106 may transmit data to the cloud computing system 110 during daylight hours and not during non-daylight hours (e.g., tint levels may not be changing during non-daylight hours). In another example, the gateway 106 transmits data to the cloud computing system 110 during occupied modes (e.g., glare control, manual control, etc.) and not during unoccupied modes (e.g., tint levels may not be changing during non-occupied modes). In another example, the gateway transmits data to the cloud computing system 110 during weekdays and not during weekends (e.g., tint levels may not be changing during weekends). In some embodiments, the gateway 106 transmits data at higher rates during one or more of daylight or occupied times and at lower rates during non-daylight or unoccupied times (e.g., data is less likely to be changing during non-daylight and unoccupied times, so it may be less relevant).

In some embodiments, the cloud computing module 224 (e.g., by an API microservice of the cloud computing module 224) receives requests from an application (e.g., from dashboard web app 140, dashboard mobile app, etc.). For example, a request may be for a status update of one or more devices (e.g., EC windows 130, drivers 104, gateway 106, etc.) of the electrochromic window system 200. The cloud computing module 224 may transmit the requests to the gateway 106 via the broker module 222. The gateway 106 may send a response to the broker module 222, and the cloud computing module 224 may obtain the response from the broker module 222, and the cloud computing module 224 may provide the response to the application (e.g., to dashboard web app 140, dashboard mobile app, etc.). In some embodiments, multiple components (e.g., modules, apps, etc.) may participate in the requests. For example, an API microservice of the cloud computing module 224 may receive a request (e.g., from the dashboard mobile app 142, dashboard web app 140, etc.) and perform the actions corresponding to the request. A second microservice of the cloud computing module 224 may obtain the result (e.g., the result of the API microservice performing the actions corresponding to the request) and store the result (e.g., in a database of the cloud computing system 110). A dashboard mobile app 142 or dashboard web app 140 may retrieve the result stored by the second microservice and may display the result to the user. In some embodiments, the cloud computing module 224 may communicate with the gateway 106 by going through a different intermediary than the broker module 222.

In some embodiments, the gateway 106 may receive an indication from the distributed EMS 102 that the power has gone out. The gateway 106 may determine (e.g., based on the settings files) a tint level that should be used for the EC windows 130 during power outage (e.g., clear all EC windows 130, tint all EC windows 130, etc.). The gateway 106 may control the drivers 104 to set the EC windows 130 to the determined tint level during the power outage (e.g., using the power stored in the distributed EMS 102). In some embodiments, the drivers 104 may receive an indication from the distributed EMS 102 that the power has gone out. The drivers 104 may determine (e.g., based on a configuration file of the driver) a tint level that should be used for the EC windows 130 during power outage (e.g., clear all EC windows 130, tint all EC windows 130, etc.). The drivers 104 may set the EC windows 130 to the determined tint level during the power outage (e.g., using the power stored in the distributed EMS 102).

In some embodiments, the gateway 106 may determine (e.g., based on settings files) a first tint level for an unoccupied state (e.g., interior sensor 206 does not detect motion in an office) and a second tint level for an occupied state (e.g., interior sensor 206 detects motion in an office). Responsive to receiving a signal indicating motion from an interior sensor 206, the gateway 106 may cause the drivers 104 to set the EC windows 130 to the second tint level. If a signal indicating motion from an interior sensor 206 is not received for a threshold amount of time, the gateway 106 may cause the drivers 104 to set the EC windows 130 to the first tint level.

In some embodiments, the electrochromic window system 200 may use machine learning to control the EC windows 130. The cloud computing module 224 may generate a data set (e.g., training set, validation set, testing set) including data input and target output. The data input may include historical conditions including one or more of sensor data (e.g., from interior sensors 206, exterior sensors 216), the time of day, day of the week (e.g., weekend or weekday), or the time of year (e.g., specific date, month, season, etc.). In one example, the historical conditions may include the occupancy sensor determining movement in the building, the roof sensor detecting direct sunlight, and it being a weekday at specific time and on a specific day. In another example, the historical conditions are the time of day, weekday or weekend, and time of year (e.g., night on a weekday in January). The target output may be the actual tint level of the EC window 130 (e.g., 0% tint, 50% tint, 100% tint, etc.). The cloud computing module 224 may train the machine learning model based on the data set to generate a trained machine learning model. In some embodiments, the cloud computing module 224 may split the data set into one or more of a training set, validation set, or testing set and the cloud computing module 224 may one or more of train, validate, or test the machine learning module based on the data set.

In some embodiments, the cloud computing module 224 receives current conditions (e.g., including one or more of sensor data, time of day, day of the week, or time of year), inputs the current conditions into the trained machine learning model, extracts a predicted tint level of each of the EC windows 130 from output of the trained machine learning model, and causes the EC windows 130 to be tinted at the predicted tint level. In some embodiments, the cloud computing module 224 deploys the trained machine learning model to the gateway 106 and the gateway receives the current conditions, inputs the current conditions into the trained machine learning model, extracts a predicted tint level of each of the EC windows 130 from output of the trained machine learning model, and causes the EC windows 130 to be tinted at the predicted tint level.

Responsive to the tint level of the EC windows 130 being set based on the predicted tint levels, the cloud computing module 224 may determine user input adjusting the tint levels of one or more of the EC windows 130. The cloud computing module 224 may use the actual tint level responsive to the user input and the current conditions that corresponded to that actual tint level to re-train the trained machine learning module. In some embodiments, the cloud computing module 224 may train and re-train the machine learning model without use of sensor data from one or more of exterior sensors 216 or interior sensors 206. In some embodiments, the trained machine learning model can be specific to a particular user (e.g., the occupant of an office, a group of users) and may be retrained to be specific to a different user or one or more additional users (e.g., responsive to a different user or one or more additional users becoming occupants of the office).

The memory 204 of the gateway 106 may store credentials files. The processing device 202 of the gateway 106 may use the credentials files to communicate with the cloud computing system 110. The credentials files may be created or configured responsive to the gateway 106 being established (e.g., during commissioning) as a trusted device for performing certain actions and controlling certain devices (e.g., the drivers 104). The cloud computing system 110 may be aware of (e.g., responsive to commissioning) which devices (e.g., gateway 106, drivers 104, tint selector 120, interior sensor 206, etc.) are linked (e.g., physically, via a network, via an application).

The cloud computing system 110 may send one or more of software or firmware updates for devices in the electrochromic window system 200. For example, the cloud computing system 110 may transmit a gateway software update to the gateway 106 for updating the software of the gateway 106. The cloud computing system 110 may transmit a sensor hub software update to the sensor hub 126 for updating the software of the sensor hub 126. The cloud computing system 110 may transmit a driver software or firmware updates to the gateway 106 and, upon receiving the driver software or firmware updates, the processing device 202 of the gateway 106 may update the drivers 104 based on the driver software or firmware updates (e.g., by transmitting a corresponding driver software or firmware update to each of the drivers 104). The processing device 202 may store the driver software or firmware updates in the memory 204 and update the drivers 104 at a point in time when the drivers 104 are not in use (e.g., at night). The processing device 202 may update a first subset of the drivers 104 at a first point in time and a second subset of the drivers at a second point in time (e.g., update in batches, update one at a time, etc.). In some embodiments, to re-flash or upgrade the firmware of a driver 104 may take a predetermined amount of time (e.g., five to ten minutes). By the gateway 106 re-flashing or upgrading the firmware of each driver 104 (e.g., one by one, at a categorical level), may save processor overhead and bandwidth of the cloud computing system 110.

Responsive to the electrochromic window system 200 being set up (e.g., commissioned), the gateway 106, drivers 104, and sensor hub 126 may be configured for the electrochromic window system 200. For example, each driver 104 may be configured for the specific type of corresponding EC window, a specific size of the corresponding EC window 130, a specific group or scene of EC windows (e.g., the EC window 130 corresponding to the driver 104 is to be set to a corresponding tint level during a specific group or scene), etc. The configurations of each driver 104 may be stored in a corresponding configuration file. The configuration file may be stored in the memory 204 of the gateway 106 and at the cloud computing system 110. Responsive to determining that a driver 104 being replaced by a new driver, the gateway 106 may configure the new driver based on the configuration file of the previous driver 104. For example, the new driver may be scanned and registered with the cloud computing system 110 and the cloud computing system 110 may cause the gateway 106 to transmit the configuration data (e.g., security parameters for the wireless mesh network, configurations based on the size and type of EC window that corresponds to the driver, scene or group of the EC window that corresponds to the driver, configuration file, etc.) to the new driver to configure the new driver.

The configurations of a gateway 106 may be stored in a gateway configuration file at the cloud computing system 110. The configurations of the gateway 106 may include number of EC windows 130 or drivers 104 to which the gateway 106 is coupled, to which drivers 104 the gateway 106 is coupled, configurations of the drivers 104, a default schedule for controlling the EC windows, default actions to take responsive to user input (e.g., via tint selector 120, etc.), to which interior sensors 206 the gateway 106 is coupled, how to transmit data to the cloud computing system 110, settings (e.g., schedules, rules, etc.) of the gateway 106, etc. Responsive to determining that the gateway 106 has been replaced, the cloud computing system 110 may configure the new gateway based on the gateway configuration file of the previous gateway 106. For example, an identifier (e.g., serial number) of the new gateway 106 may be transmitted to the cloud computing system 110 (e.g., responsive to being scanned) and the cloud computing system 110 may configure the new gateway based on the configurations of the previous gateway 106. Responsive to determining that a gateway 106 and a driver 104 have been replaced, the cloud computing system 110 may configure the new gateway based on the gateway configuration file of the previous gateway 106 and may transmit a configuration file for the new driver to the new gateway so that the new gateway may configure the new driver based on the configuration file of the previous driver 104. In some embodiments, the configurations (e.g., gateway configuration file) of the gateway 106 may include credentials (e.g., for communicating with the cloud computing system 110). The credentials of a new gateway may be configured based on the configurations of a previous gateway. In some embodiments, one or more of the credentials of the new gateway may be generated anew (e.g., via commissioning, via communication with the server device of the cloud computing system 110, etc.).

The configurations of a sensor hub 126 may be stored in a sensor hub configuration file at the cloud computing system 110. The configurations of the sensor hub 126 may include exterior sensors 216 to which the sensor hub 126 is coupled, periods of time to transmit sensor data and periods of time not to transmit sensor data (e.g., transmit during daylight hours and not at night), how to transmit sensor data (e.g., how often, transmit an average or median), etc. Responsive to determining that the sensor hub 126 has been replaced, the cloud computing system 110 may configure the new sensor hub based on the sensor hub configuration file of the previous sensor hub 126.

The tint selector 120 may transmit (e.g., multicast) a signal. In some embodiments, the signal is multicast (e.g., a multicast signal) that includes instructions for one or more EC windows 130 to be set at one or more tint levels. Each driver 104 that receives the signal may determine whether the signal applies to that driver 104 (e.g., whether the driver 104 is associated with one of the EC windows 130 specified by the signal). In some embodiments, the signal is multicast (e.g., a multicast signal) to the gateway 106 and a set of drivers 104 that corresponds to the set of EC windows 130 that are to be controlled based on the signal. In some embodiments, a thread range extender 138 may expand the signal coverage of signals transmitted by the tint selector 120 (e.g., so that devices further away from the tint selector 120 may receive the signal). In some embodiments, the tint selector may transmit a first signal to a first driver 104 and a second signal to a second driver 104 to execute a scene (e.g., set one EC window to a first tint level and a second EC window to a second tint level). In some embodiments, the tint selector 120 may transmit a signal to the first and second drivers 104 and the first driver 104 may determine, based on the signal, that the first driver 104 is to set the first EC window to a first tint level and the second driver 104 may determine, based on the same signal, that the second driver is to set the second EC window to a second tint level to execute a scene.

A driver 104 that receives the instructions from the tint selector 120 (and determines that the instructions pertain to that driver 104) may set the tint level of the corresponding EC window 130 (e.g., without receiving any instructions from the gateway 106, even if the gateway 106 is offline, based on the instructions from the tint selector 120). The tint selector 120 may directly transmit the signal to the gateway 106 and the gateway 106 may transmit the signal to the cloud computing system 110. In some embodiments, the tint selector 120 may re-transmit the signal until the tint selector 120 receives an acknowledgement (e.g., from the gateway 106, or from the corresponding drivers 104) that the signal was received.

The gateway 106 may receive settings files from the cloud computing system 110. The settings files may include one or more of default settings, default instructions, a default schedule, default rules, etc. For example, the settings files may indicate that the EC windows 130 are to be set to a first tint level at a first predetermined time and are to be set at a second tint level at a second predetermined time (e.g., over a period of time, such as tinting instructions for the next week). The settings files may assume that there is a clear sky with no clouds. The settings files may assume a typical sky pattern (e.g., typically cloudy certain times of day for that time of year). The gateway 106 may receive weather information via a different source than the cloud computing system 110). The settings files may indicate that the EC windows 130 are to be at a first tint level responsive to a first signal (e.g., from a security system, based on a power failure, from a heating ventilation and air conditioning (HVAC) system, etc.). The gateway 106 may generate first instructions (e.g., default instructions) based on the settings files and may transmit the first instructions to the drivers 104 to control the EC windows 130 based on the settings files. The gateway 106 may receive second instructions (e.g., deviating from the default settings, based on user input via dashboard mobile app 142 or dashboard web app 140, based on exterior sensors 216, based on glare control algorithm, etc.) from the cloud computing system 110 and may transmit the second instructions to the drivers 104 to control the EC windows 130 based on the second instructions. In some embodiments the second instructions may override the first instructions. For example the second instructions from the tint selector 120 or from the dashboard mobile app 142 may be given priority over the first instructions (e.g. default instructions).

The sensor hub 126 may be coupled to one or more exterior sensors 216 (e.g., a roof mounted irradiance sensor, a camera, an image detector, etc.). The sensor hub 126 may receive sensor data from each of the exterior sensors 216. The processing device 212 of the sensor hub 126 may one or more of process the sensor data received from the exterior sensors 216 or transmit the sensor data to the cloud computing system 110. The processing device 212 may one or more of process or transmit the sensor data based on configurations (e.g., configuration file) of the sensor hub 126. In some embodiments, the processing device 212 only transmits sensor data at specified times (e.g., during daylight hours) and not at other times (e.g., not at night). In some embodiments, the processing device 212 determines a first subset of the sensor data (e.g., sensor data that has changed more than a threshold amount, sensor data that indicates change in direct sunlight, etc.) that is more relevant than a second subset of the sensor data (e.g., sensor data that does not change over time, sensor data that indicates no change in direct sunlight) and transmits the first subset to the cloud computing system 110 at a faster rate than the second subset (e.g., only transmits the first subset, stores the second subset to send periodically, disregards the second subset, etc.). In some embodiments, the processing device 212 of the sensor hub 126 determines a median sensor data value (e.g., for ten second intervals) and periodically transmits the median sensor data values (e.g., on thirty second intervals) to the cloud computing system 110. In some embodiments, sensor data that is not transmitted may be disregarded (e.g., not stored).

Figure 3:
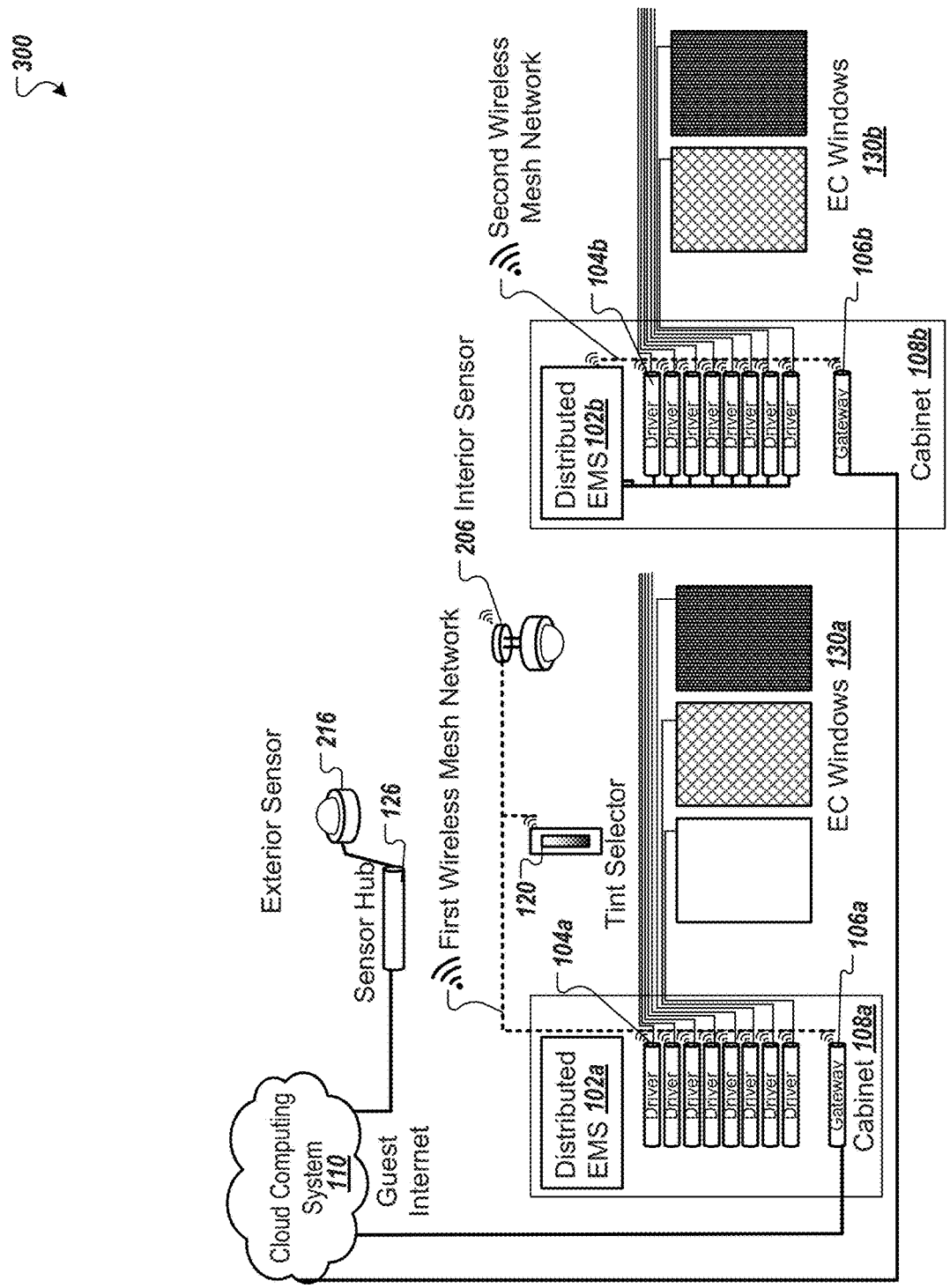
FIG. 3 is a block diagram of an electrochromic window system that includes a plurality of gateways, according to certain embodiments.

FIG. 3 is a block diagram of an electrochromic system 300 that includes multiple gateways 106, according to certain embodiments. Components with the same reference number as those in one or more of FIG. 1 or FIG. 2 may include similar or the same functionalities as those described in relation to one or more of FIG. 1 or FIG. 2.

In some embodiments, each gateway 106 may be coupled to corresponding drivers 104 that control corresponding EC windows 130. For example, gateway 106*a* may be coupled to drivers 104*a* that control EC windows 130*a* and gateway 106*b* may be coupled to drivers 104*b* that control EC windows 130*b*. The gateway 106*a* and drivers 104*a* may be on a first wireless mesh network and the gateway 106*b* and drivers 104*b* may be on a second wireless mesh network (e.g., the EC windows 130 span more than one wireless mesh network). The drivers 104*a* may be coupled to a gateway 106*a* and drivers 104*b* to gateway 106*b* because of capacities (e.g., capacity of each gateway 106, cabinet 108, distributed EMS 102, wireless mesh network, etc.), length of cables, etc.

In some embodiments, data or signals from one or more of the sensor hub 126, exterior sensors 216, interior sensors 206, or tint selector 120 may be used by the cloud computing system 110 to control EC windows 130*a* associated with gateway 106*a* and EC windows 130*b* associated with gateway 106*b*. EC windows 130*a* associated with gateway 106*a* and EC windows 130*b* associated with gateway 106*b* may be proximate each other (e.g., located in the same building or in buildings that are proximate to each other). Data from exterior sensors 216 may be used by the cloud computing system 110 to control EC windows 130*a* and 130*b* (e.g., direct sunlight sensed by exterior sensors 216 may affect the EC windows 130*a* and 130*b*). Sensor hub 126 may transmit the sensor data received from exterior sensors 216 to the cloud computing system 110 and the cloud computing system 110 may transmit instructions to the gateway 106*a* and gateway 106*b* based on the sensor data received from the sensor hub 126 (e.g., instruction both gateways 106 to change the tint level of the corresponding EC windows 130 responsive to direct sunlight sensed or lack of direct sunlight sensed by the exterior sensors 216, etc.).

In some embodiments, one gateway 106 receives a signal indicating that the tint level of EC windows 130 (e.g., in a group, scene, etc.) are to be changed. For example, the signal may be associated with a tint level and identifiers corresponding to a set of drivers 104. The EC windows may be coupled to different gateways 106 (e.g., on different wireless mesh networks). For example, in FIG. 3, interior sensors 206, tint selector 120, etc. are coupled to gateway 106*a* (e.g., via a first wireless mesh network) and provide a signal (e.g., corresponding to a group or scene) indicating that tint level of EC windows 130*a* (coupled to the gateway 106*a*) and tint level of EC windows 130*b* (coupled to gateway 106*b*, e.g., on a second wireless mesh network) are to be changed (e.g., tint level of EC windows 130*a* and 130*b* in the same group or scene is to be changed).

In some embodiments, the interior sensors 206 include an occupancy sensor and responsive to the interior sensor 206 transmitting a detected motion signal, all of the gateways 106 are to exit an unoccupied mode. In some embodiments, the interior sensors 206 include a sensor that detects light (e.g., detect direct sunlight on a window, detect direct sunlight in the building, detect light in the building) and responsive to the interior sensor 206 transmitting a light-detected signal, multiple gateways are to enter a glare control mode. In some embodiments, a gateway 106 is coupled to the HVAC system (e.g., via an interior sensor 206) and responsive to receiving a signal indicating that a corresponding tint level of the EC windows 130 would lower energy usage or increase comfort, multiple gateways 106 are to set corresponding EC windows 130 to the corresponding tint level. In some embodiments, a gateway 106 may receive a signal (e.g., from a security system, from building management) indicating that tint level of all EC windows 130 coupled to all gateways 106 are to be changed (e.g., clear all EC windows 130, tint all EC windows 130).

Responsive to gateway 106*a* receiving a signal (e.g., from interior sensor 206, tint selector 120, keypad, HVAC system, security system, building management, etc.) that is for multiple gateways 106, the gateway 106*a* may transmit the signal to the cloud computing system 110 (e.g., to a broker module 222 executing on a server device of the cloud computing system 110, to perform keypad bridging). The cloud computing system 110 (e.g., via cloud computing module 224) may determine that the signal is associated with additional gateways 106 (e.g., gateway 106*b*) and may transmit the signal to the additional gateways 106 (e.g., via the broker module 222). Upon receiving the signal from the cloud computing system 110 (e.g., via the broker module 222), the gateway 106*b* may cause the drivers 104*b* to control the EC windows 130*b* based on the signal.

Figure 4:
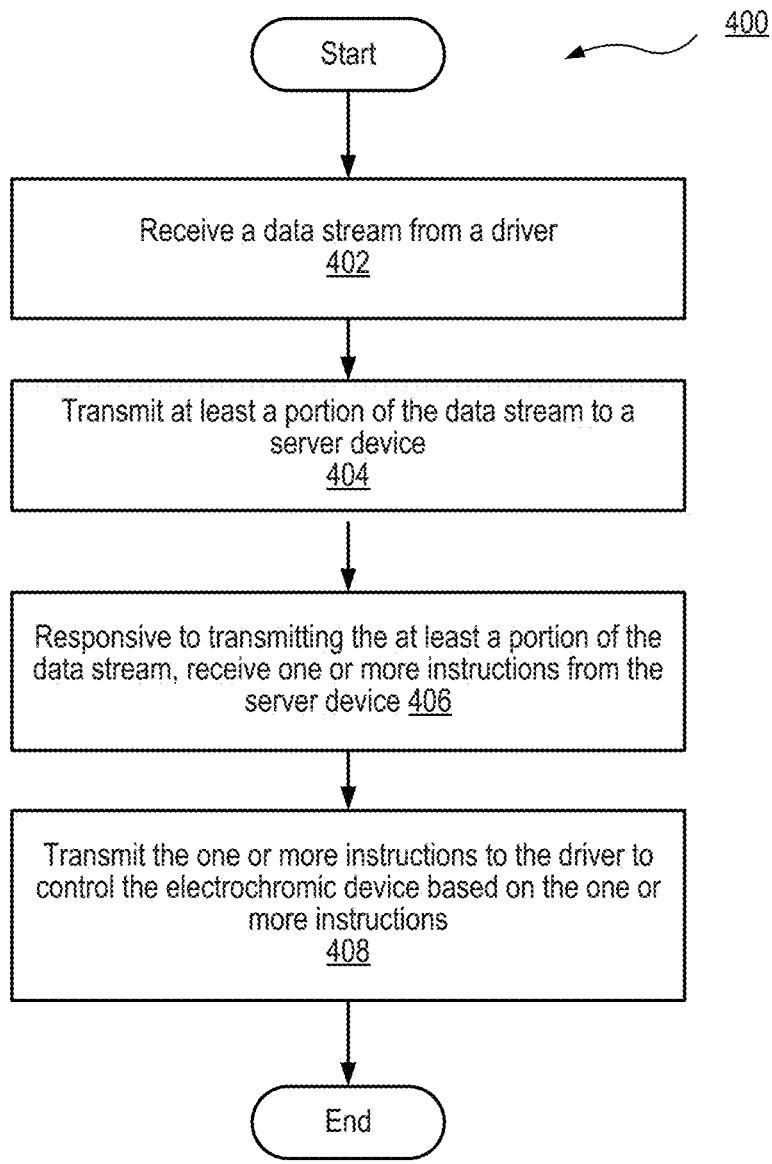
FIG. 4 is a flow diagram of a method of controlling an electrochromic device, according to certain embodiments.

FIG. 4 is a flow diagram of a method of controlling an electrochromic device (e.g., EC window 130), according to certain embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the gateway 106 of FIG. 1 or FIG. 2 or the gateway 106a or 106b of FIG. 3. In another embodiment, the method 400 is performed by processing device 202 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 4, the method 400 begins at block 402 by the processing logic receiving a data stream from the driver 104. The data stream may include one or more of current measurements of an electrochromic device (e.g., EC window 130) controlled by the driver 104, voltage measurements of the electrochromic device, temperature of the electrochromic device, faults of the electrochromic device, changes to the tint level of the electrochromic device, etc.

At block 404, the processing logic transmits at least a portion of the data stream (e.g., associated with the electrochromic devices) to a server device (e.g., of cloud computing system 110 of one or more of FIGS. 1-3). The processing logic (e.g., of the gateway remote from the server) may use credentials files (e.g., received from the server device and/or received during commissioning) stored in memory 204 of the gateway 106 to communicate with the server device. In some embodiments, the processing logic identifies a first subset of the data stream (e.g., faults of the electrochromic device, changes to the tint level of the electrochromic device, etc.) that is more relevant than a second subset of the data stream (e.g., current measurements, voltage measurements). In some embodiments, the processing logic identifies the first subset of the data stream by identifying changes in data (e.g., change in temperature, change in voltage, change in current, change in tint level, etc.) that is more than a threshold amount of change. The processing logic may transmit the first subset to the server device (e.g., upon identifying the first subset as more relevant). The processing device may store the second subset in a data file and may transmit the data file (e.g., subsequent to compressing the data file) to the server device at a predetermined time (e.g., the data file of less relevant data may be transmitted daily at a predetermined time). In some embodiments, responsive to identifying the first subset that is more relevant that the second subset, the processing logic transmits the first subset to the server device and stores the data stream (e.g., the first subset and the second subset) in the data file that is to be transmitted at the predetermined time (e.g., more relevant and less relevant data is stored in the data file). The data file may be stored and transmitted at the predetermined time for data backup purposes. In some embodiments, the server device may determine the current tint level of the electrochromic device based on the at least a portion of the data stream transmitted by the processing logic to the server device. The server device may store data differently based on how the data was transmitted (e.g., transmitted in the first subset that is more relevant, sent in the data file that includes data that is less relevant, etc.). The processing logic may transmit different types of data (e.g., first subset that is more relevant, second subset that is less relevant, data file, etc.) with an identifier associated with the type of data (e.g., identifying the data as more relevant, less relevant, data file that includes more and less relevant data, data backup, etc.).

In some embodiments, the processing logic communicates (e.g., during commissioning) with a global server device (e.g., global API, global server, etc.) to determine with which local server device (e.g., regional server such as North America server or Europe server, etc.) the processing logic is to communicate. For example, the processing logic may send a request (e.g., including a location identifier) to the global server device during commissioning and the global server device may transmit a response (e.g., including a URL) indicating with which local server device the processing logic is to communicate. After determining with which local server device the processing logic is to communicate, the processing logic directly communicates (e.g., during day-to-day communications) with the local server device (e.g., the processing logic only communicates with the global server device during commissioning).

At block 406, the processing logic, responsive to transmitting the at least a portion of the data stream (e.g., first subset, changes in tint level, faults, etc.) to the server device, receives one or more instructions (e.g., based on the at least a portion of the data stream) from the server device. In some embodiments, responsive to transmitting the at least a portion of the data stream that indicates that the electrochromic device is at a tint level, the processing logic may receive one or more instructions from the server device indicating to change the tint level of the electrochromic device (e.g., responsive to the server device determining via glare control based on sensor data received from the sensor hub 126 that the electrochromic device is to be at a different tint level, responsive to the server device receiving user input to change the tint level via the dashboard web app 140 or dashboard mobile app 142, etc.). The processing logic may receive instructions from the server device to control the electrochromic device responsive to the server device determining the tint level of the electrochromic device is to be different than the current tint level indicated in the at least a portion of the data stream transmitted to the server device.

At block 408, the processing logic, responsive to receiving the one or more instructions from the server device, transmits the one or more instructions to the driver 104 to control the electrochromic device based on the one or more instructions. The processing logic may cause the driver 104 to control the tint level of the electrochromic device based on the one or more instructions. In some embodiments, the processing logic is to cause the driver 104 to control the tint level of the electrochromic device based on settings files (e.g., default settings, default schedule, default rules) stored in the memory 204 of the gateway 106. The processing logic may receive the settings files from the server device. The processing logic may receive the one or more instructions from the server device to deviate from the settings files (e.g., responsive to the server device determining that the tint level is to be different from the default settings of the settings files).

The processing logic may receive a notification (e.g., as part of the data stream) from the driver 104 that the tint level of the electrochromic device has been updated based on the one or more instructions and the processing logic may transmit the notification (e.g., as part of a first subset of the data stream that is more relevant) to the server device.

In some embodiments, the processing logic (e.g., of the gateway remote from the server) may receive driver software updates from the server device for the driver 104 and may update the driver 104 based on the driver software updates. In some embodiments, the processing logic (e.g., of the gateway remote from the server) may determine that the driver 104 has been replaced with a new driver and may configure the new driver based on a configuration file stored in the memory 204 of the gateway 106. The processing logic may transmit the software updates and/or configuration data (e.g., configuration file) to a driver to update and/or configure the driver.

In some embodiments, the processing logic may receive data (e.g., a signal, multicast signal, etc.) from a device. For example, the data may be a signal (e.g., received from a tint selector 120) for controlling the electrochromic device and a second electrochromic device from a tint selector 120. In another example, the data may be sensor data (e.g., received from an interior sensor, an exterior sensor, a sensor hub, etc.). In some embodiments, the processing logic may transmit the data (e.g., signal, sensor data) to the server device (e.g., a third party server device, a messaging platform, etc.) and the server device may cause a second gateway 106b to control the second electrochromic device based on the data. In some embodiments, the processing logic (e.g., of a first gateway 106a) transmits the data (e.g., signal, sensor data) to the second gateway 106b for the second gateway 106b to control the second electrochromic device based on the data.

Figure 5:
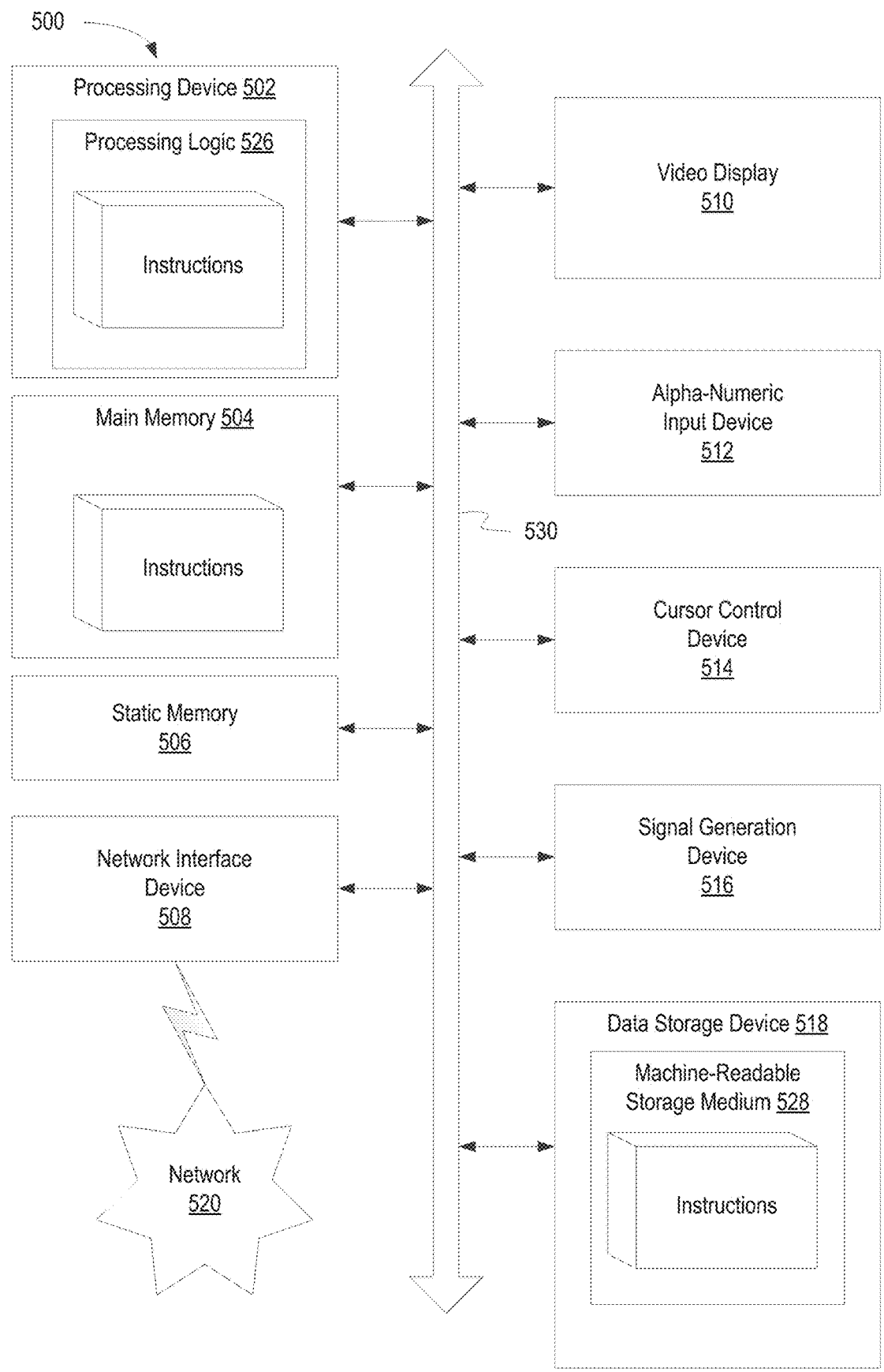
FIG. 5 illustrates a diagrammatic representation of a machine in the example form of a computer system including a set of instructions executable by a computer system to control an electrochromic device according to any one or more of the methodologies discussed herein.

FIG. 5 illustrates a diagrammatic representation of a machine in the example form of a computer system including a set of instructions executable by a computer system 500 to control an electrochromic device according to any one or more of the methodologies discussed herein. In some embodiments, computer system 500 is a server device of a cloud computing system (e.g., cloud computing system 110 of one or more of FIGS. 1-3). In some embodiments, computer system 500 is a gateway (e.g., gateway 106 of one or more of FIGS. 1-3). The computer system 500 may have more or less components than those shown in FIG. 5 (e.g., gateway 106 may have fewer components than shown in computer system 500). In one embodiment, the computer system may include instructions to enable execution of the processes and corresponding components shown and described in connection with FIGS. 1-4.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 500 includes a processing device (processor) 502 (e.g., processing device 202), a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to perform the operations and processes described herein.

The computer system 500 may further include a network interface device 508. The computer system 500 also may include a video display unit 510 (e.g., a light emitting diode (LED) display, a liquid crystal display (LCD) or a cathode ray tube (CRT)), a human interface device 512 (e.g., keyboard, gesture-control input device, touchpad, touchscreen, voice-controlled speaker, an alphanumeric input device, or the like), a cursor control device 514 (e.g., a mouse, touchpad, touchscreen, or the like), and a signal generation device 516 (e.g., a speaker).

The data storage device 518 may include a computer-readable storage medium 528 (or machine-readable medium) on which is stored one or more sets of instructions embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," identifying," "transmitting," "storing," "receiving," "updating," determining," "configuring," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
   a gateway having
      a memory, and
      a processing device coupled to the memory, the processing device to:
         receive a data stream from a driver controlling a set of electrochromic devices;
         identify a first subset of the data stream, wherein the first subset of the data stream comprises sensor data that has changed more than a threshold amount;
         responsive to identifying the first subset of the data stream, transmit the first subset of the data stream to a server device and store at least a second subset of the data stream in a data file in the memory of the gateway, wherein the server device is to generate one or more instructions based on the first subset of the data stream;
         responsive to transmitting the first subset of the data stream to the server device, receive the one or more instructions from the server device; and
         transmit the one or more instructions to the driver to cause the set of electrochromic devices to be controlled based on the one or more instructions.

2. The system of claim 1, wherein:
   the sensor data that has changed more than the threshold amount is indicative of one or more of a fault associated with at least one electrochromic device of the set of electrochromic devices or a change to a tint level of the at least one electrochromic device;
   the first subset of the data stream is transmitted by the processing device to the server device at a faster rate than the second subset of the data stream is transmitted by the processing device to the server device; and
   the data file is to be transmitted to the server device at a predetermined time subsequent to the second subset being stored in the data file.

3. The system of claim 1, wherein the memory is further to store one or more credentials files, wherein the processing device is to use the one or more credentials files to communicate with the server device.

4. The system of claim 1, wherein the processing device is further to:
   receive a driver software update from the server device; and
   update the driver based on the driver software update.

5. The system of claim 1, wherein the memory is further to store a configuration file, wherein the processing device is further to:
   determine the driver has been replaced with a new driver; and
   configure the new driver based on the configuration file.

6. The system of claim 1, wherein the processing device is further to:
   receive a signal from a tint selector, wherein the set of electrochromic devices and one or more other electrochromic devices coupled to a second gateway are to be controlled based on the signal; and
   transmit the signal to the server device to cause the server device to control the one or more other electrochromic devices based on transmitting the signal to the second gateway.

7. The system of claim 1, wherein the memory is further to store one or more settings files received from the server device, wherein the processing device is further to:
- generate first instructions based on the one or more settings files; and
- transmit the first instructions to the driver to control the set of electrochromic devices based on the one or more settings files.

8. A method comprising:
- receiving, by a processing device of a gateway, a data stream from a driver controlling a set of electrochromic devices;
- identifying a first subset of the data stream, wherein the first subset of the data stream comprises sensor data that has changed more than a threshold amount;
- responsive to the identifying of the first subset of the data stream, transmitting, by the processing device, the first subset of the data stream to a server device and storing at least a second subset of the data stream in a data file in memory of the gateway, wherein the server device is to generate one or more instructions based on the first subset of the data stream;
- responsive to the transmitting of the first subset of the data stream to the server device, receiving, by the processing device, the one or more instructions from the server device; and
- transmitting, by the processing device, the one or more instructions to the driver to cause the set of electrochromic devices to be controlled based on the one or more instructions.

9. The method of claim 8 wherein:
- the sensor data that has changed more than the threshold amount is indicative of one or more of a fault associated with at least one electrochromic device of the set of electrochromic devices or a change to a tint level of the at least one electrochromic device;
- the first subset of the data stream is transmitted by the processing device to the server device at a faster rate than the second subset of the data stream is transmitted by the processing device to the server device; and
- the data file is to be transmitted to the server device at a predetermined time subsequent to the second subset being stored in the data file.

10. The method of claim 8 further comprising:
storing one or more credentials files in the memory; and
using the one or more credentials files to communicate with the server device.

11. The method of claim 8 further comprising:
receiving a driver software update from the server device; and
updating the driver based on the driver software update.

12. The method of claim 8 further comprising:
storing a configuration file in the memory;
determining that the driver has been replaced with a new driver; and
configuring the new driver based on the configuration file.

13. The method of claim 8 further comprising:
receiving a signal from a tint selector, wherein the set of electrochromic devices and one or more other electrochromic devices coupled to a second gateway are to be controlled based on the signal; and
transmitting the signal to the server device to cause the server device to control the one or more other electrochromic devices based on transmitting the signal to the second gateway.

14. The method of claim 8 further comprising:
storing, in the memory, one or more settings files received from the server device;
generating first instructions based on the one or more settings files; and
transmitting the first instructions to the driver to control the set of electrochromic devices based on the one or more settings files.

15. A non-transitory machine-readable storage medium storing instructions which, when executed cause a processing device of a gateway to perform operations comprising:
- receiving a data stream from a driver controlling a set of electrochromic devices;
- identifying a first subset of the data stream, wherein the first subset of the data stream comprises sensor data that has changed more than a threshold amount;
- responsive to the identifying of the first subset of the data stream, transmitting, by the processing device, the first subset of the data stream to a server device and storing at least a second subset of the data stream in a data file in memory of the gateway, wherein the server device is to generate one or more instructions based on the first subset of the data stream;
- responsive to the transmitting of the first subset of the data stream to the server device, receiving, by the processing device, the one or more instructions from the server device; and
- transmitting, by the processing device, the one or more instructions to the driver to cause the set of electrochromic devices to be controlled based on the one or more instructions.

16. The non-transitory machine-readable storage medium of claim 15 wherein:
- the sensor data that has changed more than the threshold amount is indicative of one or more of a fault associated with at least one electrochromic device of the set of electrochromic devices, a change to a tint level of the at least one electrochromic device;
- the first subset of the data stream is transmitted by the processing device to the server device at a faster rate than the second subset of the data stream is transmitted by the processing device to the server device; and
- the data file is to be transmitted to the server device at a predetermined time subsequent to the second subset being stored in the data file.

17. The non-transitory machine-readable storage medium of claim 15, wherein the operations further comprise:
storing one or more credentials files in the memory; and
using the one or more credentials files to communicate with the server device.

18. The non-transitory machine-readable storage medium of claim 15, wherein the operations further comprise:
receiving a driver software update from the server device; and
updating the driver based on the driver software update.

19. The non-transitory machine-readable storage medium of claim 15, wherein the operations further comprise:
storing a configuration file in the memory;
determining that the driver has been replaced with a new driver; and
configuring the new driver based on the configuration file.

20. The non-transitory machine-readable storage medium of claim 15 further comprising:
receiving a signal from a tint selector, wherein the set of electrochromic devices and one or more other electrochromic devices coupled to a second gateway are to be controlled based on the signal; and transmitting the signal to the server device to cause the server device to control the one or more other electrochromic devices based on transmitting the signal to the second gateway.

* * * * *